June 4, 1946.  N. I. KORMAN  2,401,572
ROTATING JOINT FOR PARALLEL WIRE TRANSMISSION LINES
Filed June 9, 1943
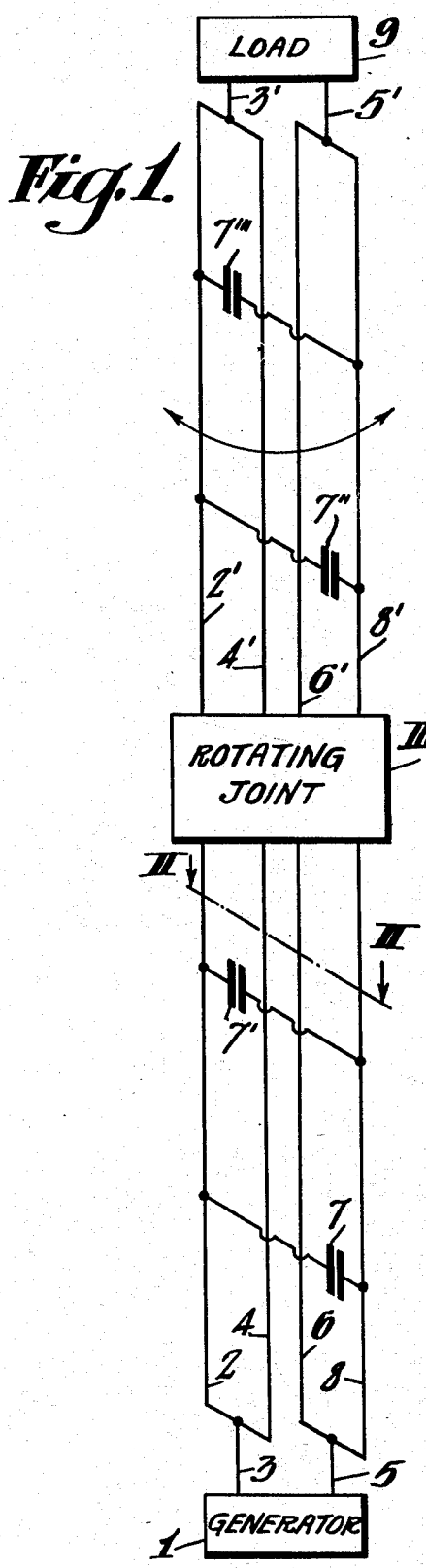
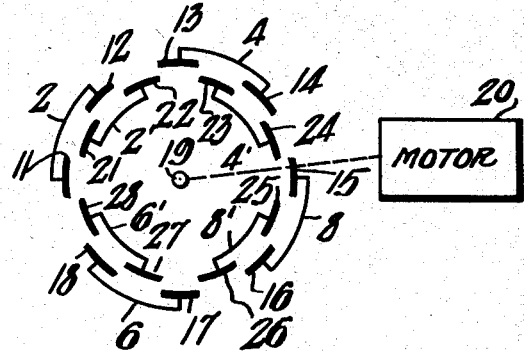
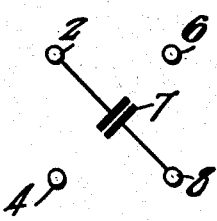
Inventor
Nathaniel I. Korman
By C. D. Tuska
Attorney Patented June 4, 1946

2,401,572

UNITED STATES PATENT OFFICE 2,401,572

ROTATING JOINT FOR PARALLEL WIRE TRANSMISSION LINES

Nathaniel I. Korman, Camden, N. J., assignor to Radio Corporation of America, a corporation of Delaware Application June 9, 1943, Serial No. 490,388

6 Claims. (Cl. 178—44)

This invention relates generally to high frequency transmission circuits and more particularly to a rotating joint in a parallel wire transmission line which feeds a rotating antenna or other load device from a stationary transmitter.

Rotary joints have been used extensively heretofore for coupling stationary transmitting or receiving equipment to rotating antenna systems. A device of this nature is disclosed in U. S. Patent No. 1,820,647 granted to A. W. Brown on August 25, 1931, wherein a commutator and brushes provide the coupling means between radio apparatus and a rotary loop antenna. The instant invention is an improvement over such prior art devices in that sliding contacts and complicated mechanical structure are avoided.

In parallel wire transmission circuits having conventional rotating joints, one of the principal difficulties is the effect of the joint on the phase of the currents in the line conductors and on the field adjacent the line. The instant invention contemplates a rotating joint for a single phase parallel wire transmission line wherein the line currents are split in phase to provide quadrature currents which produce a rotating field adjacent a predetermined portion of the line. The rotating field is derived by splitting each of the parallel conductors of the two wire line into pairs of parallel disposed conductors arranged in the form of a square. The four resultant wires arranged at the corners of the square therefore comprise two separate transmission lines in planes which are perpendicular. In one or both of the line phase shifters are inserted so that the currents in the two lines are in quadrature.

The rotating joint may be inserted at any desired point in the four wire two phase line and may comprise, for example, relatively rotatable capacitive electrodes for each of the four line conductors. Since the field adjacent the four conductor line is rotating, the rotation of the capacitive joint will have substantially no detrimental effect upon the line currents or upon the field surrounding the line. The rotating capacitive joint may be driven by means of a conventional motor drive associated therewith, or may be actuated by any other means known in the art.

Among the objects of the invention are to provide an improved rotating joint for a parallel wire high frequency transmission line. Another object of the invention is to provide improved means for relatively orienting predetermined portions of a high frequency transmission line without disturbing the currents in said line and the field surrounding said line. A further object of the invention is to provide an improved rotating joint for a parallel wire high frequency transmission line wherein the single phase currents on a two wire parallel line are converted to quadrature currents on a four wire parallel line, a capacitive rotating joint is inserted in the four wire parallel line, and the quadrature currents on the four wire parallel line are again converted to single phase currents on a two wire parallel line. A further object of the invention is to provide an improved motor driven rotating joint for a high frequency parallel wire transmission line. An additional object of the invention is to provide a rotatable joint in a high frequency parallel transmission line connected between a source of high frequency energy and a load device wherein said rotating joint comprises a rotatable capacitive device inserted at a point in said line having quadrature currents which produce a rotating field adjacent thereto.

The invention will be described in further detail by reference to the accompanying drawing of which Figure 1 is a schematic diagram of one embodiment thereof, Figure 2 is a cross-sectional view of the conductors of Figure 1 showing the relative arrangement thereof, and Figure 3 is a schematic diagram of a motor driven rotating joint illustrated by a block diagram in Figure 1. Similar reference numerals are applied to similar elements throughout the drawing.

Referring to Figure 1, a generator 1 of high frequency currents is connected to a parallel wire single phase transmission line comprising the conductors 3, 5. The first conductor 3 is connected to both conductors 2, 4 of a first pair of parallel conductors which terminate in a rotating joint device III, which will be described in detail hereinafter. The second conductor 5 of the parallel wire single phase line is connected to both conductors 6, 8 of a second pair of parallel conductors which also terminate in the rotating joint. The pairs of parallel disposed conductors 2, 4 and 6, 8 are arranged at the corners of a square in the manner shown schematically in Figure 2. The four parallel disposed conductors therefore comprise two parallel lines 2, 8 and 4, 6 having planes which are disposed normal to each other.

Phase splitting devices illustrated as capacitors 7, 7' are connected along one, or both, of the pairs of normally disposed parallel lines in spaced relation as shown to provide a phase displacement of 90° between the currents in the two lines. From the discussion of transmission line phenomena in the Journal of the Institution of Electrical Engineers, vol. 84 (1939), pp. 448–467, it may be shown that if a transmission line is shunted by two reactances, each equal in magnitude to one-half the characteristic impedance of the line and spaced one-eighth wavelength apart, that a phase shift of 90° will result. The resultant quadrature currents provide as mentioned heretofore, a rotating field about the four parallel disposed conductors 2, 4, 6 and 8. The four conductors terminate in fixed capacitive electrodes equi-spaced about the periphery of a circle in the rotating joint III. Movable capacitive electrodes concentric with the fixed capacitive electrodes in the rotating joint III terminate third and fourth pairs of conductors 2', 4' and 6', 8' which are substantially coaxial with the first and second pairs of conductors 2, 4, and 6, 8. The third and fourth pairs of conductors 2', 4', 6', 8' similarly comprise normally disposed parallel lines 2', 8', and 4', 6'. One or both of the lines 2', 8' and 4', 6' may include phase shifting devices such as, for example, the capacitors 7'' and 7'''. The parallel conductors 2', 4' are connected together and connected to a single conductor 3'; and the parallel conductors 6', 8' are connected together and connected to a parallel disposed second conductor 5'. The parallel disposed conductors 3', 5' may be connected to a load device 9.

Figure 2 is a section II—II of Figure 1 indicating the arrangement of the four parallel disposed conductors 2, 4, 6, 8 and the connection of the capacitor 7 between the conductors 2 and 8 to provide desired phase displacement between the currents in the lines 2, 8 and 4, 6, respectively.

Referring to Figure 3, the rotating joint III is illustrated schematically as a group of eight arcuate fixed electrodes 11, 12, 13, 14, 15, 16, 17, 18 disposed at equal angles and at equal radii around a common center 19. Relatively rotatable arcuate electrodes 21, 22, 23, 24, 25, 26, 27, 28 are similarly spaced at equal angles and at slightly smaller radii about the center 19, and arranged to rotate as a unit in capacitive relation to the fixed electrodes. The fixed electrodes 11, 12 are connected together and connected to the first conductor 2, the fixed electrodes 13, 14 are connected together and connected to the conductor 4. The fixed conductors 15, 16 are connected together and connected to the conductor 8, and the fixed electrodes 17, 18 are connected together and connected to the conductor 6.

Similarly, the movable electrodes 21, 22 are connected together and connected to the conductor 2'; the movable electrodes 23, 24 are connected together and connected to the conductor 4'; the movable conductors 25, 26 are connected together and connected to the conductor 8', and the movable conductors 27, 28 are connected together and connected to the conductor 6'.

The movable conductors 21, 22, 23, 24, 25, 26, 27 and 28 are a part of the rotary load structure and are rotated with it by means of a motor drive 20 which is connected to the center point 19 in any convenient manner.

Thus, the invention disclosed comprises an improved method of and means for providing a rotating joint in a high frequency transmission line, wherein single phase currents are converted to quadrature currents providing a rotating field and the line conductors are switched by means of a rotary capacitive joint which may be motor driven. It should be understood that the particular construction illustrated is purely illustrative of the invention, and that various mechanical modifications may be employed to accomplish applicant's novel contribution to the art.

I claim as my invention:

1. Apparatus for providing a rotary joint in a single phase two-wire ultra-high frequency transmission line including first conductive means responsive to single phase currents on said line for deriving phase quadrature currents, second conductive means rotatably disposed adjacent said first conductive means, rotary reactive means coupled to said first conductive means for forming a rotating field and including an axially symmetrical rotary reactive element coupled to said second conductive means and to said rotating field, and a second two-wire line responsive to coupled quadrature currents in said second conductive means for deriving single phase currents proportional to the currents in said transmission line.

2. Apparatus for providing a rotary joint in a two-wire high frequency transmission line comprising a first group of two pairs of parallel disposed conductors, means connecting both conductors of each of said pairs to different ones of said two wires, means responsive to single phase currents applied to said two-wire line for deriving phase quadrature currents in said two pairs of conductors, a second similar group of two pairs of parallel disposed conductors, rotary capacitive means having a plurality of stationary electrodes coupled to the conductors of said first group for forming a rotating field and a plurality of axially symmetrical rotary capacitive electrodes coupled to the conductors of said second group and capacitively coupled to said stationary electrodes, an output two-wire line, and means terminating said second group of conductors in said output two-wire line to derive therein single phase currents in phase with said applied currents.

3. Apparatus for providing a rotary joint in a two-wire high frequency transmission line comprising a first group of two pairs of parallel disposed conductors, means connecting both conductors of each of said pairs to different ones of said two wires, phase splitting means connected between said pairs of conductors and responsive to single phase currents applied to said two wire line for deriving phase quadrature currents in said two pairs of conductors, a second similar group of two pairs of parallel disposed conductors, rotary capacitive means having a plurality of stationary electrodes connected to the conductors of said first group for forming a rotating field and a plurality of coaxial rotary capacitive electrodes connected to the conductors of said second group and capacitively coupled to said stationary electrodes, an output two-wire line, and means terminating said second group of conductors in said output two-wire line to derive therein single phase currents in phase with said applied currents.

4. Apparatus for providing a rotary joint in a two-wire high frequency transmission line comprising a first group of two pairs of parallel disposed conductors, means connecting both conductors of each of said pairs to different ones of said two wires, phase splitting means connected between said pairs of conductors and responsive to single phase currents applied to said two wire line for deriving phase quadrature currents in said two pairs of conductors, a second similar group of two pairs of parallel disposed conductors, second phase splitting means connected between said pairs of conductors of said second group, rotary capacitive means having a plurality of stationary electrodes connected to the conductors of said first group for forming a rotating field and a plurality of axially symmetrical rotary capacitive electrodes connected to the conductors of said second group and capacitively coupled to said stationary electrodes, an output two-wire line, and means terminating said second group of conductors in said output two-wire line to derive therein single phase currents in phase with said applied currents.

5. Apparatus for providing a rotary joint in a two-wire high frequency transmission line comprising a first group of two pairs of parallel disposed conductors, means connecting both conductors of each of said pairs to different ones of said two wires, means responsive to single phase currents applied to said two wire line for deriving phase quadrature currents in said two pairs of conductors, a second similar group of two pairs of parallel disposed conductors, motor driven rotary capacitive means having a plurality of stationary electrodes rigidly connected to the conductors of said first group for forming a rotating field and a plurality of axially symmetrical rotary capacitive electrodes rigidly connected to the conductors of said second group and capacitively coupled to said stationary electrodes, an output two-wire line, and means terminating said second group of conductors in said output two-wire line to derive therein single phase currents in phase with said applied currents.

6. Apparatus for providing a rotary joint in a two-wire high frequency transmission line comprising a first group of two pairs of parallel disposed conductors disposed with respect to each other at the corners of a square, means connecting both conductors of each of said pairs to different ones of said two wires, phase splitting means connected between said pairs of conductors and responsive to single phase currents applied to said two wire line for deriving phase quadrature currents in said two pairs of conductors, a second similar group of two pairs of parallel disposed conductors disposed with respect to each other at the corners of a square, second phase splitting means connected between said pairs of conductors of said second group, rotary capacitive means having a plurality of stationary electrodes rigidly connected to the conductors of said first group for forming a rotating field and a plurality of coaxial rotary capacitive electrodes rigidly connected to the conductors of said second group and capacitively coupled to said stationary electrodes, an output two-wire line, and means terminating said second group of conductors in said output two-wire line to derive therein single phase currents in phase with said applied currents.

NATHANIEL I. KORMAN.